US012673518B2

(12) United States Patent
Kitamura

(10) Patent No.: US 12,673,518 B2
(45) Date of Patent: Jul. 7, 2026

(54) TIRE

(71) Applicant: SUMITOMO RUBBER INDUSTRIES, LTD., Kobe (JP)

(72) Inventor: Naoya Kitamura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/211,750

(22) Filed: Jun. 20, 2023

(65) Prior Publication Data

US 2023/0415514 A1 Dec. 28, 2023

(30) Foreign Application Priority Data

Jun. 24, 2022 (JP) ................................ 2022-101539

(51) Int. Cl.

| | |
|---|---|
| ***B60C 1/00*** | (2006.01) |
| ***B60C 11/00*** | (2006.01) |
| ***C08K 3/04*** | (2006.01) |
| ***C08K 3/36*** | (2006.01) |
| ***C08L 7/00*** | (2006.01) |

(52) U.S. Cl.

CPC ........ *B60C 1/0016* (2013.01); *B60C 11/0008* (2013.01); *B60C 11/005* (2013.01); *C08K 3/04* (2013.01); *C08K 3/36* (2013.01); *C08L 7/00* (2013.01); *B60C 2011/0025* (2013.01); *B60C 2011/0033* (2013.01); *C08K 2201/005* (2013.01); *C08K 2201/006* (2013.01)

(58) Field of Classification Search

CPC ............... B60C 11/005; B60C 11/0025; B60C 2011/0033; B60C 11/0008

See application file for complete search history.

(56) References Cited

U.S. PATENT DOCUMENTS

| | | | | |
|---|---|---|---|---|
| 2012/0132332 A1* | 5/2012 | Zhao | B60C 11/00 152/209.5 |
| 2014/0011944 A1* | 1/2014 | Kondo | C08K 3/013 524/526 |
| 2018/0194934 A1* | 7/2018 | Varagniat | B60C 1/00 |
| 2019/0168542 A1* | 6/2019 | Hashimoto | C08L 7/00 |
| 2020/0040168 A1* | 2/2020 | Watanabe | C08K 5/09 |
| 2022/0212501 A1* | 7/2022 | Misaki | B60C 11/0008 |
| 2022/0235209 A1* | 7/2022 | Washizu | B60C 11/0008 |
| 2023/0286321 A1* | 9/2023 | Hamamura | B60C 11/033 |

FOREIGN PATENT DOCUMENTS

| | | | | |
|---|---|---|---|---|
| EP | 3260305 A1 * | 12/2017 | B60C 1/00 |
| EP | 3 693 185 A1 | 8/2020 | |
| EP | 3 950 386 A1 | 2/2022 | |
| EP | 4 008 568 A1 | 6/2022 | |
| JP | 2015209164 A * | 11/2015 | |
| JP | 2020-128131 A | 8/2020 | |
| JP | 2021-95507 A | 6/2021 | |
| JP | 2021-165324 A | 10/2021 | |
| JP | 2022-29764 A | 2/2022 | |
| JP | 2022-87807 A | 6/2022 | |

* cited by examiner

*Primary Examiner* — Cedrick S Williams

(74) *Attorney, Agent, or Firm* — Birch, Stewart, Kolasch & Birch, LLP

(57) ABSTRACT

Provided is a tire having a tread portion with a thickness of 15 mm or less, wherein the cap rubber layer forming the tread portion is formed from a rubber composition containing 40 parts by mass or more and 80 parts by mass or less of styrene-butadiene rubber (SBR) with a styrene content of 25% by mass or less, in 100 parts by mass of the rubber component, and in addition to the rubber component, containing silica and carbon black; and having loss tangent 30° C. tan δ of more than 0.18 measured under the conditions of temperature of 30° C., frequency of 10 Hz, initial strain of 5%, dynamic strain rate of 1%, and deformation mode: tensile; wherein the carbon black content is 15 parts by mass or more with respect to 100 parts by mass of the rubber component, and the ratio of the silica content to the carbon black content is 1 or more; and an object of the present invention is to improve chipping resistance performance when running on a rough road surface at high speed.

12 Claims, No Drawings

TIRE

TECHNICAL FIELD

The present invention relates to tires.

BACKGROUND ART

When a vehicle runs on a rough road surface, the surface of the tread portion of the tire may be partially damaged due to contact with the road surface. If the vehicle continues to run in this state, stress will concentrate on the scratches and it grows large, causing chipping of the blocks provided on the surface of the tread portion (chipping). For this reason, it is necessary to secure sufficient chipping resistance performance for the tire.

Therefore, conventionally, it has been proposed to improve the chipping resistance performance by devising the rubber composition constituting the tread portion of the tire and the surface shape of the tread portion (for example, Patent documents 1 to 3).

PRIOR ART DOCUMENTS

Patent Document

[Patent document 1] JP-A-2021-165324
[Patent document 2] JP-A-2021-95507
[Patent document 3] JP-A-2020-128131

SUMMARY OF INVENTION

Problem to be Solved by the Invention

However, the chipping resistance performance of tires manufactured based on the above-described prior art is still not sufficient for high-speed running on rough road surfaces, and further improvement is desired.

Accordingly, an object of the present invention is to improve chipping resistance performance when running on a rough road surface at high speed.

Means for Solving the Problem

The present invention is a tire having a tread portion with a thickness of 15 mm or less, wherein the cap rubber layer forming the tread portion is formed from a rubber composition containing 40 parts by mass or more and 80 parts by mass or less of styrene-butadiene rubber (SBR) with a styrene content of 25% by mass or less, in 100 parts by mass of the rubber component, and in addition to the rubber component, containing silica and carbon black; and having loss tangent 30° C. tan δ of more than 0.18 measured under the conditions of temperature of 30° C., frequency of 10 Hz, initial strain of 5%, dynamic strain rate of 1%, and deformation mode: tensile; wherein the carbon black content is 15 parts by mass or more with respect to 100 parts by mass of the rubber component, and the ratio of the silica content to the carbon black content is 1 or more.

Effect of the Invention

According to the present invention, it is possible to improve chipping resistance performance when running on a rough road surface at high speed.

EMBODIMENTS FOR CARRYING OUT THE INVENTION

[1] Features of the Tire According to the Present Invention

First, the features of the tire according to the present invention will be explained.

1. Overview

The tire according to the present invention has a tread portion having a thickness of 15 mm or less, and the cap rubber layer forming the outermost layer of the tread portion; and is formed from a rubber composition, which contains 40 parts by mass or more and 80 parts by mass or less of SBR having a styrene content of 25% by mass or less in 100 parts by mass of the rubber component, and contains silica and carbon black in addition to the rubber component; and has a loss tangent 30° C. tan δ of more than 0.18 measured under the conditions where the temperature is 30° C., the frequency is 10 Hz, the initial strain is 5%, and the dynamic strain rate is 1%, and the deformation mode is tensile. In this rubber composition, the content of carbon black is 15 parts by mass or more with respect to 100 parts by mass of the rubber component, and the ratio of the content of silica to the content of carbon black is 1 or more.

Here, the cap rubber layer refers to a rubber layer provided on the outer side in the radial direction of the tire, but is not limited to the rubber layer forming the outermost layer of the tread portion. If there are two or more layers within 5 mm from the tread surface toward the inside, at least any one layer satisfies the requirements of the rubber composition.

By having these features, as will be described later, it is possible to improve the chipping resistance performance when running on a rough road surface at high speed.

2. Mechanism of Effect Manifestation in Tire According to the Present Invention

The mechanism of effect manifestation in the tire according to the present invention is considered as follows.

As described above, the cap rubber layer of the tire according to the present invention contains 40 parts by mass or more and 80 parts by mass or less of SBR having a styrene content of 25% by mass or less in 100 parts by mass of the rubber component. As a result, a network of a small amount of styrene domains can be properly formed in the rubber matrix, and strain due to deformation of the rubber can be easily alleviated.

Since the SBR having such a low styrene content has low heat build-up, it is possible to improve the chipping resistance performance together with the alleviation of the strain of the rubber by the styrene domains described above.

The above styrene content is more preferably 20% by mass or less, and further preferably 15% by mass or less. On the other hand, as the lower limit, it is preferably 3% by mass or more, more preferably 5% by mass or more, and further preferably 8% by mass or more.

In the present invention, the phrase "contains 40 parts by mass or more and 80 parts by mass or less of SBR having a styrene content of 25% by mass or less in 100 parts by mass of the rubber component" indicates that the amount of SBR in 100 parts by mass of the rubber component is 40 parts by mass or more and 80 parts by mass or less, and the styrene content in the entire SBR is 25% by mass or less.

That is, when a styrene-containing polymer (SBR) is contained alone in the rubber component, it indicates that the styrene content in the polymer is 25% by mass or less, and when multiple styrene-containing polymers (SBR) are contained in the rubber component, it shows that the styrene content obtained from the sum of the product of the styrene content (mass %) in each polymer and the compounding amount (mass parts) per 100 mass parts of the rubber component of the polymer is 25 mass % or less.

More specifically, when 100 parts by mass of the rubber component contains SBR1 (X1 parts by mass) with a styrene content of S1 mass % and SBR2 (X2 parts by mass) with a styrene content of S2 mass %, it is indicated that the styrene content calculated from the formula $\{(S1\times X1)+(S2\times X2)\}/(X1+X2)$ is 25% by mass or less.

In addition, in the vulcanized rubber composition, it is possible to calculate by determining the amount of styrene contained in the rubber component after acetone extraction by solid-state nuclear magnetic resonance (solid-state NMR) or Fourier transform infrared spectrophotometer (FTIR).

In addition, 30° C. tan δ of the rubber composition forming the cap rubber layer, measured under the conditions where the temperature is 30° C., the frequency is 10 Hz, the initial strain is 5%, and the dynamic strain rate is 1%, and the deformation mode: tensile, is more than 0.18.

Loss tangent tan δ is a viscoelastic parameter that indicates energy absorption performance. The larger the value, the more energy generated by rubber deformation can be absorbed and released as heat, and the occurrence of chipping due to rubber deformation is suppressed. Therefore, chipping resistance performance can be improved. The loss tangent 30° C. tan δ described above is more preferably 0.19 or more, further preferably 0.24 or more, further preferably 0.26 or more, further preferably 0.29 or more, further preferably 0.30 or more, further preferably 0.31 or more, further preferably 0.33 or more, and further preferably 0.36 or more. Although the upper limit is not particularly limited, it is preferably 0.45 or less, more preferably 0.43 or less, and further preferably 0.40 or less.

In the above, the loss tangent (tan δ) can be measured, for example, using a viscoelasticity measuring device such as "Eplexor (registered trademark)" series manufactured by GABO.

In addition, the 30° C. tan δ mentioned above can be appropriately adjusted depending on the type and content of compounding materials described later. Specifically, the 30° C. tan δ can be increased by increasing the content of SBR in the rubber component, increasing the content of styrene in the SBR component, increasing the content of fillers such as silica and carbon black, reducing the particle size of the filler, and increasing the content of the resin component. Conversely, it can be lowered by reducing the content of SBR in the rubber component, reducing the content of styrene in the SBR component, reducing the content of fillers such as silica and carbon black, increasing the particle size of the filler, and reducing the content of the resin component.

In addition, the rubber composition contains 15 parts by mass or more of carbon black with respect to 100 parts by mass of the rubber component, and the ratio of the content of silica to the content of carbon black is 1 or more, that is the content ratio is increased. As a result, good elongation at break can be obtained while sufficiently reinforcing the rubber component, and the rubber itself can be made resistant to deformation.

In the present invention, the content of carbon black is more preferably 30 parts by mass or more, further preferably 35 parts by mass or more, further preferably 40 parts by mass or more, further preferably 42 parts by mass or more, further preferably 45 parts by mass or more with respect to 100 parts by mass of the rubber component. Although the upper limit is not particularly limited, it is preferably 70 parts by mass or less, more preferably 60 parts by mass or less, and further preferably 50 parts by mass or less. Also, the ratio of the content of silica to the content of carbon black is more preferably 1.1 or more, more preferably 1.2 or more, and further preferably 1.3 or more. Although the upper limit is not particularly limited, it is preferably 3.3 or less, more preferably 2.4 or less, further preferably 2.2 or less, further preferably 1.7 or less, and further preferably 1.6 or less.

Furthermore, in the present invention, since the thickness of the tread portion is set to 15 mm or less, it is possible to reduce the amount of deformation of the rubber, suppress heat accumulation in the tread portion, and suppress strength deterioration of the rubber due to the temperature rises. In the present invention, the thickness of the tread portion is more preferably 12 mm or less, and further preferably 10 mm or less.

In the present invention, the tread portion is a member in the region forming the ground contact surface of the tire, and refers to the portion radially outside of members containing fiber materials such as the carcass, belt layer, and belt reinforcing layer.

Here, the thickness of the tread portion refers to the thickness of the tread portion on the tire equatorial plane in the cross section in the tire radial direction. When the tread portion is formed of a single rubber composition, it refers the thickness of the rubber composition, and in the case of a laminated structure of multiple rubber compositions, it refers to the total thickness of these layers. When the tire has a groove on the equatorial plane, it refers to the thickness from the intersection of a straight line connecting the radially outermost end points of the groove with the tire equatorial plane to the radially innermost interface of the tread portion. The thickness of the tread portion can be measured by aligning the bead portion with the standardized rim width in a cross section obtained by cutting the tire in the radial direction.

The "standardized rim" is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design Rim" described in "YEAR BOOK". JATMA, ETRTO, and TRA are referred to in that order, and if there is an applicable size at the time of reference, that standard is followed. In the case of tires that are not specified in the standard, it refers a rim that can be assembled and can maintain internal pressure, that is, the rim that does not cause air leakage from between the rim and the tire, and has the smallest rim diameter, and then the narrowest rim width.

As described above, in the present invention, the cap rubber layer itself is formed with high strength to easily absorb deformation, and the thickness of the tread portion is reduced to suppress the amount of rubber deformation and heat accumulation and high strength can be maintained during rolling. As a result, sufficient chipping resistance can be exhibited even when running on rough roads at high speed.

[2] More Preferable Embodiment of the Tire According to the Present Invention The tire according to the present invention can obtain a larger effect by taking the following embodiment.

1. Glass Transition Temperature Tg

When driving on rough roads at high speed, slippage easily occurs between the tread cap rubber layer and the road surface, so the surface of the tread (cap rubber layer) is strongly susceptible to physical properties at temperatures lower than the ambient temperature.

Therefore, in the present invention, the glass transition temperature Tg (° C.) of the rubber composition constituting the cap rubber layer is preferably −45° C. or higher, more preferably −42° C. or higher, further preferably −41° C. or higher, further preferably −40° C. or higher, further preferably −37° C. or higher, and further preferably −36° C. or higher. As the upper limit, it is preferably −10° C. or lower, more preferably −15° C. or lower, even more preferably −20° C. or lower, and even more preferably −29° C. or lower. As a result, deformation on the rubber surface can be efficiently absorbed, so that sufficient chipping resistance performance can be stably exhibited even when running on rough road surfaces at high speed.

The glass transition temperature (Tg) of the rubber composition described above can be obtained based on the temperature distribution curve of tan δ measured under the conditions of a frequency of 10 Hz, an initial strain of 10%, an amplitude of 0.5%, and a heating rate of 2° C./min using a viscoelasticity measuring device such as Eplexor series manufactured by GABO. In the case of the present invention, the temperature corresponding to the largest tan δ value in the range of −60° C. or higher and 40° C. or lower in the temperature distribution curve measured is taken as the glass transition point (Tg). If there are two or more points with the largest tan δ value within the range of −60° C. or higher and 40° C. or lower, the point with the lowest temperature is taken as Tg. For example, in the present invention, if the maximum value of tan δ is in the range of −60° C. or higher and 40° C. or lower, the temperature showing the maximum value is Tg according to the above definition. In addition, when a temperature distribution curve where the temperature showing the maximum value of tan δ is −60° C. is obtained, for example, in a case where tan δ gradually decreases as the temperature rises in the range of −60° C. or higher and 40° C. or lower, the glass transition temperature (Tg) is −60° C. according to the above definition.

The glass transition temperature (Tg) described above can be appropriately adjusted depending on the type and content of compounding materials described later. Specifically, it can be lowered by reducing the SBR content in the rubber component, reducing the styrene content in the SBR component, reducing the content of the resin component, or the like, and it can be raised by increasing the SBR content in the rubber component, increasing the styrene content in the SBR component, increasing the content of the resin component, or the like.

2. 100% Modulus (M100)

In the present invention, the 100% modulus (M100) of the rubber composition constituting the cap rubber layer is preferably more than 2.0 MPa, and more preferably more than 2.2 MPa.

Although the upper limit is not particularly limited, it is preferably less than 6.0 MPa, and more preferably less than 3.5 MPa.

Modulus is an index that indicates the strength of rubber against deformation. As in the present invention, by increasing the strength at the time of large deformation, it becomes easier to suppress the destruction of rubber, so it is possible to further improve the chipping resistance performance.

In addition, the modulus at 100% elongation (M100) described above can be measured by preparing a No. 7 dumbbell-shaped test piece with a thickness of 1 mm from a sample taken from the cap rubber layer, and conducting a tensile test (tensile speed: 500 mm/min) at 23° C. in accordance with JIS K6251: 2010.

The above modulus can be appropriately adjusted depending on the type and content of compounding materials described later. Specifically, it can be increased by increasing the content of fillers such as carbon black and silica, increasing the ratio of carbon black in fillers, increasing the content of resin components, reducing the amount of plasticizers, increasing the amount of vulcanizing agents such as sulfur and accelerators, or the like. On the other hand, it can be lowered by reducing the content of fillers such as carbon black and silica, reducing the ratio of carbon black in the filler, reducing the content of resin components, increasing the amount of plasticizer, reducing vulcanizing agents such as sulfur and accelerators.

3. Contains Fine Particle Silica

As described above, in the present invention, the rubber composition constituting the cap rubber layer contains silica. In order to further improve the chipping resistance performance, preferably more than ½ of the silica is fine particle silica. As a result, the reinforcing properties by the fine particle silica can be fully exhibited, and the chipping resistance performance can be improved.

Here, fine particle silica refers to silica having an average particle size of 18 nm or less, and the average particle size is more preferably 16 nm or less, and further preferably 15 nm or less. On the other hand, as the lower limit, it is preferably 6 nm or more, more preferably 9 nm or more, and further preferably 12 nm or more.

The above-mentioned average particle size can be obtained by taking a photo using a transmission electron microscope (TEM), and taking the diameter of the sphere as the particle size when the shape of the particles is spherical, taking the minor axis as the particle size in the case of a needle-like or rod-like shape, or taking the average particle size from the center as the particle size in the case of an irregular shape, and then taking the average value of the particle sizes of 100 fine particles as the average particle size.

4. Contains Amine Compounds

The rubber composition of the present invention preferably contains an amine compound represented by the following formula as a dispersant together with the silica.

[Chemical 1]

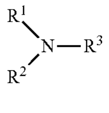

In the above formula, $R^1$ represents a hydrocarbon group. $R^2$ and $R^3$ are the same or different and represent a hydrogen atom, a hydrocarbon group, or a $-(AO)_n$—H group (n is an integer of 1 or more), and each n of $R^2$ and $R^3$ may be the same or different. Each of "AO" may be the same or different and represents an oxyalkylene group having 2 or more carbon atoms, and at least one of $R^2$ and $R^3$ is a $-(AO)_n$—H group.

The oxyalkylene group in the compound interacts with the hydroxyl group on the silica surface, whereby the silica can be sufficiently dispersed in the rubber matrix and the chipping resistance performance can be further improved.

The hydrocarbon groups represented by $R^1$ to $R^3$ may be linear, branched or cyclic, and examples thereof include aliphatic hydrocarbon groups, alicyclic hydrocarbon groups and aromatic hydrocarbon groups. Among them, an aliphatic hydrocarbon group is preferred. The number of carbon atoms in the hydrocarbon group is preferably 1 or more, more preferably 5 or more, further preferably 8 or more, and particularly preferably 12 or more. It is preferably 30 or less, more preferably 25 or less, further preferably 22 or less, and particularly preferably 20 or less. Within the above range, the effect tends to be obtained more favorably.

Specific examples of the compounds represented by the above formula include POE (2) octylamine, POE (4) decylamine, POE (2) dodecylamine, POE (5) dodecylamine, POE (15) dodecylamine, POE (2) tetradecylamine, POE (2) hexadecylamine, POE (2) octadecylamine, POE (20) octadecylamine, and POE (2) octadecenylamine. POE (m) indicates that polyoxyethylene is added in an average of m mol. As these commercially available products, products of Kao Corporation, Lion Specialty Chemicals Co., Ltd., etc. can be used.

The content of the dispersant is preferably more than 0.5 parts by mass and less than 10 parts by mass, more preferably 1 part by mass or more and 8 parts by mass or less, and particularly preferably 2 parts by mass with respect to 100 parts by mass of the rubber component.

5. Relationship Between Tread Thickness and Tan δ

As described above, it is considered that energy loss in the cap rubber layer is increased by setting the tan δ of the cap rubber layer at 30° C. to more than 0.18, and deformation and heat accumulation are suppressed by setting the thickness of the tread portion to 15 mm or less. Among them, by setting the ratio of tan δ at 30° C. (30° C. tan δ) of the cap rubber layer to the thickness T (mm) of the tread portion (30° C. tan δ/T) to 0.006 or more, more preferably 0.01 or more, further preferably 0.015 or more, further preferably 0.02 or more, and further preferably 0.025 or more, it is considered that compatibility of the energy loss in the cap rubber layer and the effect of suppressing deformation and heat accumulation due to the thickness of the tread can be improved, and the chipping resistance performance at high speed can be further improved. The 30° C. tan δ/T is further preferably 0.026 or more, further preferably 0.027 or more, further preferably 0.028 or more, further preferably 0.029 or more, and further preferably 0.031 or more. On the other hand, the upper limit is not particularly limited, but it is preferably 0.15 or less, more preferably 0.1 or less, further preferably 0.075 or less, further preferably 0.050 or less, and further preferably 0.045 or less.

6. Relationship Between Tread Thickness and M100

As described above, it is considered that the strength can be increased, and the chipping resistance performance can be improved by setting the 100% modulus (M100) of the cap rubber to more than 2.0 MPa. On the other hand, it is considered that the amount of deformation in the tread portion tends to increase as the thickness of the tread portion increases. Therefore, it is considered that, by setting the ratio of M100 (MPa) to tread thickness T (mm) (M100/T) to 0.05 or more, more preferably 0.1 or more, further preferably 0.13 or more, and further preferably 0.15 or more, sufficient strength against deformation in the tread portion can be obtained, and the chipping resistance performance can be improved more easily. The M100/T is further preferably 0.17 or more, further preferably 0.18 or more, further preferably 0.19 or more, further preferably 0.20 or more, further preferably 0.22 or more, further preferably 0.24 or more, further preferably 0.26 or more, further preferably 0.27 or more, and further preferably 0.28 or more. On the other hand, although the upper limit is not particularly limited, it is preferably 2 or less, more preferably 1.5 or less, further preferably 1 or less, further preferably 0.80 or less, more preferably 0.70 or less, and further preferably 0.65 or less.

7. Multi-Layered Tread

In the present invention, the tread portion may be formed of only one layer of the cap rubber layer provided on the outer side in the tire radial direction, or may be formed of two layers by providing the base rubber layer on the inner side of the cap rubber layer in the tire radial direction. In addition, it may have three layers, four layers or more. In the case of two or more layers, the thickness of the cap rubber layer is preferably 10% or more, and more preferably 70% or more, in order to prevent early exposure of the interface by occurrence of chipping due to growth of the scratches when scratches are caused by the road surface aggregate.

Here, the "thickness of the cap rubber layer" refers to the thickness of the cap rubber layer on the tire equatorial plane in the tire radial cross section. In case the tire has a groove on the equatorial plane, it refers to the thickness from the intersection of the straight line connecting the radially outermost endpoints of the groove and the tire equatorial plane to the interface with the innermost base rubber layer of the tread portion in the radial direction of the tire. The "thickness of the base rubber layer" refers to the thickness from the interface with the cap rubber layer to the innermost interface in the tire radial direction of the tread portion.

The thickness of the cap rubber layer and the thickness of the base rubber layer can be calculated by determining the thickness of the cap rubber layer and the thickness of the base rubber layer in the thickness of the tread portion. When a groove exists on the tire equatorial plane, it can be obtained by calculating the thickness of the cap rubber layer and the thickness of the base rubber layer at the center of the land portion of the tread portion closest to the equatorial plane.

In the present invention, the term "groove" refers to a groove having an opening width of 3 mm or more on the outermost surface of the tread portion and a depth of 3 mm or more.

In the present invention, in consideration of suppressing heat accumulation inside the tire and suppressing temperature rise of the cap rubber layer, the 30° C. tan δ of the base rubber layer is preferably smaller than the 30° C. tan δ of the cap rubber layer. The 30° C. tan δ of the base rubber layer can be appropriately adjusted according to the type and content of compounding materials described later, similarly to the 30° C. tan δ of the cap rubber layer.

8. Acetone-Extractable Content of Cap Rubber Layer (AE)

In the present invention, the acetone extractable content (AE) of the cap rubber layer is preferably 5.0% by mass or more, more preferably 6.0% by mass or more, further preferably 8.0% by mass or more, further preferably 8.1% by mass or more, further preferably 8.7% by mass or more, further preferably 9.7% by mass or more, further preferably 10.6% by mass or more, further preferably 11.7% by mass or more, further preferably 12.3% by mass or more, further preferably 13.0% by mass or more. On the other hand, although the upper limit is not particularly limited, it is preferably 25.0% by mass or less, more preferably 15.0% by mass or less, further preferably 14.7% by mass or less, further preferably 14.2% by mass or less, and further preferably 14.0% by mass or less.

The acetone extractable content (AE) can be considered as an index indicating the amount of plasticizer and the like in the rubber composition, and can also be considered as an index indicating the softness of the rubber composition. Therefore, by controlling the amount of AE in the cap rubber layer as described above, it is considered that the cap rubber layer is appropriately deformed and is easily prevented from being cut by road surface aggregates.

The acetone extractable content (AE) can be measured according to JIS K 6229:2015. Specifically, a vulcanized rubber test piece cut out from the measurement site is immersed in acetone at room temperature and normal pressure for 72 hours, and the mass reduction rate (%) of the test piece is determined to obtain AE (part by mass).

More specifically, each vulcanized rubber test piece is immersed in acetone at room temperature and normal pressure for 72 hours to extract soluble components; the mass of each test piece before and after extraction is measured; and the acetone-extractable content can be calculated by the following formula.

Acetone-extractable content (%)={(mass of rubber test piece before extraction−mass of rubber test piece after extraction)/(mass of rubber test piece before extraction)}×100

Moreover, the above-mentioned acetone-extractable content can be appropriately changed by changing the compounding ratio of the plasticizer in the rubber composition.

9. Land Ratio

In the tire according to the present invention, the land ratio in the tread portion of the tire installed on a standardized rim and having a standardized internal pressure is preferably 40% or more, more preferably 55% or more, further preferably 60% or more and further preferably 63% or more.

“Land ratio” is the ratio of the actual contact area to the virtual contact area in which all the grooves on the surface of the tread are filled. It is considered that, when the land ratio is large, since the contact area with the road surface becomes large, chipping resistance performance can be improved.

Although the upper limit of the land ratio is not particularly limited, it is preferably 95% or less.

In addition, the product of the content (parts by mass) of styrene-butadiene rubber (SBR) having a styrene content of 25% by mass or less in 100 parts by mass of the rubber component and the land ratio (%) in the tread portion is preferably 2400 or more, more preferably 2500 or more, further preferably 3000 or more, further preferably 3600 or more, further preferably 4000 or more, and further preferably 4800 or more. As a result, the effects of the styrene domain network work together to further improve the chipping resistance performance. Although the upper limit is not particularly limited, it is preferably 8000 or less, and more preferably 7000 or less.

The above land ratio can be obtained from the ground contact shape under the conditions of standardized rim, standardized internal pressure, and standardized load.

Specifically, the tire is installed on a standardized rim, a standardized internal pressure is applied, and the tire is allowed to stand at 25° C. for 24 hours). Thereafter, an ink is printed on the tire tread surface, a standardized load is applied and then the tire tread surface is pressed against a thick paper (camber angle is 0°) to transfer the ink to the paper. Thus, the contact shape can be obtained. The transfer is made at five locations by rotating the tire by 72° in the circumferential direction. That is, the ground contact shape is obtained five times. At this time, for the five ground contact shapes, the discontinuous portions with the grooves of the contour are smoothly connected, and the resulting shape is defined as a virtual contact surface.

Then, the land ratio can be obtained from (average area of the five ground contact shapes (black portions) transferred to the thick paper/average of the areas of virtual contact surfaces obtained from the five ground contact shapes)×100 (%).

Note that, the “standardized internal pressure” is the air pressure specified for each tire by the above-mentioned standards, and is the maximum air pressure for JATMA, “INFLATION PRESSURE” for ETRTO, and the maximum value described in the table “TIRE LOAD LIMITS AT VARIOUS COLD INFLATION PRESSURES” for TRA. As in the case of “standardized rim”, refer to JATMA, ETRTO, and TRA in that order, and their standards are followed. And, in the case of a tire that is not defined in the standard, it is the standardized internal pressure (however, 250 kPa or more) of another tire size (specified in the standard) for which the standardized rim is described as the standard rim. When a plurality of standardized internal pressures of 250 kPa or more are listed, the minimum value among them is referred.

In addition, the “standardized load” is the load defined for each tire by the standards in the standard system including the standard on which the tire is base and refers to the maximum mass that can be loaded on the tire, and is the maximum load capacity for JATMA, “LOAD CAPACITY” for ETRTO, and the maximum value described in “TIRE LOAD LIMITS AT VARIOUS COLD INFLATION PRESSURES” for TRA. As in the case of “standardized internal pressure”, JATMA, ETRTO, and TRA are referred to in that order, and their standards are followed. Then, in the case of a tire not specified in the standard, the standardized load WL is obtained by the following calculation.

$$V=\{(Dt/2)^2-(Dt/2-Ht)^2\}\times n\times Wt$$

$$W_L=0.000011\times V+175$$

$W_L$: standardized load (kg)
V: virtual volume of tire ($mm^3$)
Dt: tire outer diameter Dt (mm)
Ht: tire section height (mm)
Wt: cross-sectional width of tire (mm)

9. Aspect Ratio

The aspect ratio is the section height to the tire section width, and it is considered that the larger this ratio, the easier it is for the side portions to absorb the force generated in the tread portion, and thus the chipping resistance performance can be improved. On the other hand, if the aspect ratio increases, the amount of deflection at the side portion increases, which may lead to a decrease in steering stability.

Considering these points, the specific aspect ratio of the tire according to the present invention is preferably 40% or more.

In addition, the product of the silica content (parts by mass) with respect to 100 parts by mass of the rubber component and the aspect ratio is preferably 3000 or more, more preferably 3250 or more, further preferably 3900 or more, further preferably 4500 or more, further preferably 5000 or more, further preferably 5850 or more, and further preferably 7000 or more. As a result, the effects of the silica network work together to further improve the chipping resistance performance. Although the upper limit is not particularly limited, it is preferably 12000 or less, and more preferably 10000 or less.

Note that the above aspect ratio (%) can be obtained by the following formula based on the cross-sectional height Ht (mm), the cross-sectional width Wt (mm), the tire outer diameter Dt (mm), and the rim diameter R (mm) when the internal pressure is 250 kPa.

$$\text{Aspect ratio }(\%)=(Ht/Wt)\times 100(\%)$$

$$Ht=(Dt-R)/2$$

[3] Embodiment

The present invention will be specifically described below based on embodiments.

1. Rubber Composition Forming Cap Layer

In the tire according to the present invention, the rubber composition forming the cap rubber layer can be obtained by appropriately adjusting the types and amounts of various compounding materials such as the rubber component, filler, softening agent, vulcanizing agent, and vulcanization accelerator described below.

(1) Compounding Material (a) Rubber Component

The rubber component is not particularly limited, and rubbers (polymers) commonly used in the manufacture of tires can be used. Examples of the rubbers include diene rubbers such as isoprene based rubber, butadiene rubber (BR), styrene butadiene rubber (SBR), and nitrile rubber (NBR); butyl based rubber such as butyl rubber; and thermoplastic elastomers such as styrene butadiene styrene block copolymer (SBS) and styrene-butadiene block copolymer (SB).

In the present invention, among these, from the point of containing styrene in the rubber component, any one of styrene-based polymers such as SBR, SBS and SB is preferably contained, and more preferably SBR is contained. These styrene-based polymers may be used in combination with other rubber components, and for example, combination of SBR and BR, and combination of SBR, BR and isoprene rubber are preferred. Further, as the rubber component described above, an expanded rubber obtained by previously expanding by a plasticizer such as an oil, a resin, or a liquid rubber described later may be used.

(a-1) SBR

The weight average molecular weight of SBR is, for example, more than 100,000 and less than 2,000,000. Further, in the present invention, as described above, the amount of styrene in the SBR component is set to 25% by mass or less. It is more preferably 20% by mass or less, and further preferably 15% by mass or less. On the other hand, as the lower limit, it is preferably 3% by mass or more, more preferably 5% by mass or more, and further preferably 8% by mass or more.

The vinyl content (1,2-bonded butadiene content) of SBR is, for example, more than 5% by mass and less than 70% by mass. The vinyl content of SBR refers to the content of 1,2-bonded butadiene with respect to the entire butadiene portion in the SBR component. Further, structural identification of SBR (measurement of styrene content and vinyl content) can be performed using, for example, JNM-ECA series equipment manufactured by JEOL Ltd.

In the present invention, the content of SBR in 100 parts by mass of the rubber component is, as described above, 40 parts by mass or more and 80 parts by mass or less, and it is more preferably 50 parts by mass or more and 70 parts by mass or less, further preferably 55 parts by mass or more and 65 parts by mass or less.

The SBR is not particularly limited, and for example, emulsion-polymerized styrene-butadiene rubber (E-SBR), solution-polymerized styrene-butadiene rubber (S-SBR) and the like can be used. The SBR may be either a non-modified SBR or a modified SBR. In addition, hydrogenated SBR obtained by hydrogenating the butadiene portion of SBR may be used. Hydrogenated SBR may be obtained by subsequently hydrogenating the BR portion of SBR. Styrene, ethylene and butadiene may be copolymerized to give similar structures.

The modified SBR may be any SBR having a functional group that interacts with a filler such as silica. Examples thereof include

- end-modified SBR (end-modified SBR having the above functional group at the terminal) in which at least one end of the SBR is modified with a compound having the above functional group (modifying agent),
- main chain modified SBR having the functional group in the main chain,
- main chain terminal modified SBR having the functional group at the main chain and the terminal (for example, a main chain terminal modified SBR having the above functional group to the main chain and having at least one end modified with the above modifying agent), and
- end-modified SBR which is modified (coupled) with a polyfunctional compound having two or more epoxy groups in the molecule, and into which an epoxy group or hydroxyl group has been introduced.

Examples of the functional group include an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, and an epoxy group. In addition, these functional groups may have a substituent.

As modified SBR, for example, SBR modified with a compound (modifying agent) represented by the following formula can be used.

[Chemical 2]

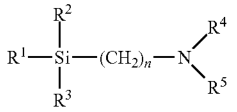

In the formula, $R^1$, $R^2$ and $R^3$ are the same or different and represent alkyl group, alkoxy group, silyloxy group, acetal group, carboxyl group (—COOH), mercapto group (—SH) or derivatives thereof. $R^4$ and $R^5$ are the same or different and represent hydrogen atoms or alkyl group. $R^4$ and $R^5$ may be combined to form a ring structure with nitrogen atoms. n represents an integer.

As the modified SBR modified by the compound (modifying agent) represented by the above formula, SBR, in which the polymerization end (active end) of the solution-polymerized styrene-butadiene rubber (S-SBR) is modified by the compound represented by the above formula (for example, modified SBR described in JP-A-2010-111753), can be used.

As $R^1$, $R^2$ and $R^3$, an alkoxy group is suitable (preferably an alkoxy group having 1 to 8 carbon atoms, more preferably an alkoxy group having 1 to 4 carbon atoms). As $R^4$ and $R^5$, an alkyl group (preferably an alkyl group having 1 to 3 carbon atoms) is suitable. n is preferably 1 to 5, more preferably 2 to 4, and further preferably 3. Further, when $R^4$ and $R^5$ are combined to form a ring structure together with a nitrogen atom, a 4- to 8-membered ring is preferable. The alkoxy group also includes a cycloalkoxy group (cyclohexyloxy group, and the like) and an aryloxy group (phenoxy group, benzyloxy group, and the like).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as the modified SBR, a modified SBR modified with the following compound (modifying agent) can also be used. Examples of the modifying agent include polyglycidyl ethers of polyhydric alcohols such as ethylene glycol diglycidyl ether, glycerin triglycidyl ether, trimethylolethanetriglycidyl ether, and trimethylolpropane triglycidyl ether;

polyglycidyl ethers of aromatic compounds having two or more phenol groups such as diglycidylated bisphenol A;

polyepoxy compounds such as 1,4-diglycidylbenzene, 1,3,5-triglycidylbenzene, and polyepoxidized liquid polybutadiene;

epoxy group-containing tertiary amines such as 4,4'-diglycidyl-diphenylmethylamine, and 4,4'-diglycidyl-dibenzylmethylamine;

diglycidylamino compounds such as diglycidylaniline, N, N'-diglycidyl-4-glycidyloxyaniline, diglycidyl orthotoluidine, tetraglycidylmetaxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis-(1-methylpropyl) carbamate chloride, 4-morpholincarbonyl chloride, 1-pyrrolidincarbonyl chloride, N, N-dimethylcarbamide acid chloride, and N, N-diethylcarbamide acid chloride;

epoxy group-containing silane compounds such as 1,3-bis-(glycidyloxypropyl)-tetramethyldisiloxane, and (3-glycidyloxypropyl)-pentamethyldisiloxane;

sulfide group-containing silane compound such as (trimethylsilyl) [3-(trimethoxysilyl) propyl] sulfide, (trimethylsilyl) [3-(triethoxysilyl) propyl]sulfide, (trimethylsilyl) [3-(tripropoxysilyl) propyl]sulfide, (trimethylsilyl) [3-(tributoxysilyl) propyl] sulfide, (trimethylsilyl) [3-(methyldimethoxysilyl) propyl] sulfide, (trimethylsilyl) [3-(methyldiethoxysilyl) propyl] sulfide, (trimethylsilyl) [3-(methyldipropoxysilyl) propyl] sulfide, and (trimethylsilyl) [3-(methyldibutoxysilyl) propyl] sulfide;

N-substituted aziridine compound such as ethyleneimine and propyleneimine;

alkoxysilanes such as methyltriethoxysilane, N, N-bis (trimethylsilyl)-3-aminopropyltrimethoxysilane, N, N-bis (trimethylsilyl)-3-aminopropyltriethoxysilane, N, N-bis (trimethylsilyl) aminoethyltrimethoxysilane, and N, N-bis (trimethylsilyl) aminoethyltriethoxysilane;

(thio) benzophenone compound having an amino group and/or a substituted amino group such as 4-N, N-dimethylaminobenzophenone, 4-N, N-di-t-butylaminobenzophenone, 4-N, N-diphenylamino benzophenone, 4,4'-bis (dimethylamino) benzophenone, 4,4'-bis (diethylamino) benzophenone, 4,4'-bis (diphenylamino) benzophenone, and N, N, N', N'-bis-(tetraethylamino) benzophenone;

benzaldehyde compounds having an amino group and/or a substituted amino group such as 4-N, N-dimethylaminobenzaldehyde, 4-N, N-diphenylaminobenzaldehyde, and 4-N, N-divinylamino benzaldehyde;

N-substituted pyroridone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;

N-substituted piperidone such as methyl-2-piperidone, N-vinyl-2-piperidone, and N-phenyl-2-piperidone;

N-substituted lactams such as N-methyl-ε-caprolactam, N-phenyl-ε-caprolactum, N-methyl-ω-laurilolactum, N-vinyl-ω-laurilolactum, N-methyl-β-propiolactam, and N-phenyl-β-propiolactam; and N, N-bis-(2,3-epoxypropoxy)-aniline, 4,4-methylene-bis-(N, N-glycidylaniline), tris-(2,3-epoxypropyl)-1, 3,5-triazine-2,4,6-triones, N, N-diethylacetamide, N-methylmaleimide, N, N-diethylurea, 1,3-dimethylethylene urea, 1,3-divinylethyleneurea, 1,3-diethyl-2-imidazolidinone, 1-methyl-3-ethyl-2-imidazolidinone, 4-N, N-dimethylaminoacetophenone, 4-N, N-diethylaminoacetophenone, 1,3-bis (diphenylamino)-2-propanone, and 1,7-bis(methylethylamino)-4-heptanone. The modification with the above compound (modifying agent) can be carried out by a known method.

As the SBR, for example, SBR manufactured and sold by Sumitomo Chemical Co., Ltd., ENEOS Material Co., Ltd, Asahi Kasei Co., Ltd., Zeon Co., Ltd., etc. can be used. The SBR may be used alone or in combination of two or more types.

(a-2) BR

In the present invention, BR may be further contained as necessary. In this case, the content of BR in 100 parts by mass of the rubber component is preferably more than 20 parts by mass, more preferably more than 30 parts by mass. On the other hand, it is preferably less than 50 parts by mass, more preferably less than 45 parts by mass.

The weight average molecular weight of BR is, for example, more than 100,000 and less than 2,000,000. The vinyl bond amount of BR is, for example, more than 1% by mass and less than 30% by mass. The cis content of BR is, for example, more than 1% by mass and less than 98% by mass. The trans content of BR is, for example, more than 1% by mass and less than 60% by mass.

BR is not particularly limited, and BR having a high cis content (cis content of 90% or more), BR having a low cis content, BR containing syndiotactic polybutadiene crystals, and the like can be used. The BR may be either a non-modified BR or a modified BR, and examples of the modified BR include a modified BR into which the above-mentioned functional group has been introduced. These may be used alone or in combination of two or more. The cis content can be measured by infrared absorption spectrum analysis.

As the BR, for example, products of Ube Industries, Ltd., ENEOS Material Co., Ltd, Asahi Kasei Co., Ltd., and Nippon Zeon Co., Ltd., etc. can be used.

(a-3) Isoprene Rubber

In the present invention, an isoprene-based rubber may be further contained as necessary. In this case, the content of the isoprene-based rubber in 100 parts by mass of the rubber component is preferably 20 parts by mass or more and 40 parts by mass or less.

Examples of the isoprene rubber include natural rubber (NR), isoprene rubber (IR), reformed NR, modified NR, and modified IR.

As the NR, for example, SIR20, RSS #3, TSR20 and the like, which are commonly used in the tire industry, can be used. The IR is not particularly limited, and for example, IR 2200 or the like, which is commonly used in the tire industry, can be used. Reformed NR includes deproteinized natural rubber (DPNR), high-purity natural rubber (UPNR), etc., and modified NR includes epoxidized natural rubber (ENR), hydrogenated natural rubber (HNR), grafted natural rubber, etc. Examples of the modified IR include epoxidized isoprene rubber, hydrogenated isoprene rubber, and grafted isoprene rubber. These may be used alone or in combination of two or more.

(a-4) Other Rubber Components

Further, as other rubber components, rubbers (polymers) generally used for manufacturing tires, such as nitrile rubber (NBR), may be contained.

(b) Compounding Materials Other than Rubber Components (b-1) Filler

In the present invention, the rubber composition preferably contains a filler. As a specific filler, as described above, silica and carbon black are used so that the ratio (content of silica/content of carbon black) is 1 or more, in the present invention. Other materials such as graphite, calcium carbonate, talc, alumina, clay, aluminum hydroxide, mica, biochar (BIO CHAR), etc. may also be contained as necessary.

(i-1) Silica

In the present invention, the rubber composition preferably contains silica, and at this time, it is preferable to contain a silane coupling agent together with silica.

The BET specific surface area of silica is preferably more than 140 $m^2/g$, more preferably more than 160 $m^2/g$, and further preferably more than 180 $m^2/g$, that is a fine particle silica, from the viewpoint of obtaining good durability performance. On the other hand, it is preferably less than 300 $m^2/g$ from the viewpoint of obtaining good rolling resistance during high-speed running. The BET specific surface area is the value of $N_2S$ A measured by the BET method according to ASTM D3037-93.

In the present invention, the content of silica is preferably 40 parts by mass or more, more preferably 50 parts by mass or more, and further preferably 60 parts by mass or more with respect to 100 parts by mass of the rubber component. On the other hand, it is preferably 150 parts by mass or less, more preferably 100 parts by mass or less, and further preferably 70 parts by mass or less.

Examples of silica include dry silica (anhydrous silica) and wet silica (hydrous silica). Among them, wet silica is preferable because it has a large number of silanol groups. Silica made from water-containing glass or the like, or silica made from biomass materials such as rice husks may also be used.

As the silica, products of Evonik Industries, Rhodia Co., Ltd., Tosoh Silica Co., Ltd., Solvay Japan Co., Ltd., and Tokuyama Co., Ltd., etc. can be used.

(i-2) Silane Coupling Agent

As described above, in the present invention, the rubber composition preferably contains a silane coupling agent together with silica. The silane coupling agent is not particularly limited, and examples thereof include

- sulfide-based ones such as bis(3-triethoxysilylpropyl)tetrasulfide, bis (2-triethoxysilylethyl)tetrasulfide, bis (4-triethoxysilylbutyl)tetrasulfide, bis(3-trimethoxysilylpropyl) tetrasulfide, bis(2-trimethoxysilylethyl) tetrasulfide, bis(2-triethoxysilylethyl)trisulfide, bis(4-trimethoxysilylbutyl) trisulfide, bis(3-triethoxysilylpropyl)disulfide, bis(2-triethoxysilylethyl) disulfide, bis(4-triethoxysilylbutyl) disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N, N-dimethylthiocarbamoyltetrasulfide, 2-triethoxysilylethyl-N, N-dimethylthiocarbamoyltetrasulfide, and 3-triethoxysilylpropylmethacrylatemonosulfide;
- mercapto-based ones such as 3-mercaptopropyltrimethoxysilane, 2-mercaptoethyltriethoxysilane, and NXT and NXT-Z manufactured by Momentive;
- vinyl-based ones such as vinyl triethoxysilane, and vinyl trimethoxysilane;
- amino-based ones such as 3-aminopropyltriethoxysilane and 3-aminopropyltrimethoxysilane;
- glycidoxy-based ones such as γ-glycidoxypropyltriethoxysilane and γ-glycidoxypropyltrimethoxysilane;
- nitro-based ones such as 3-nitropropyltrimethoxysilane, and 3-nitropropyltriethoxysilane; and
- chloro-based ones such as 3-chloropropyltrimethoxysilane, and 3-chloropropyltriethoxysilane. These may be used alone or in combination of two or more.

As the silane coupling agent, for example, products of Evonik Industries, Momentive Co., Ltd., Shin-Etsu Silicone Co., Ltd., Tokyo Chemical Industry Co., Ltd., Azumax Co., Ltd., Toray Dow Corning Co., Ltd., etc. can be used.

The content of the silane coupling agent is, for example, more than 3 parts by mass and less than 25 parts by mass with respect to 100 parts by mass of silica.

(ii) Carbon Black

In the present invention, the rubber composition further contains carbon black from the viewpoint of reinforcing properties.

Specific content of carbon black with respect to 100 parts by mass of the rubber component is equal to or less than that of silica, and it is preferably 20 parts by mass or more, more preferably 30 parts by mass or more, and further preferably 40 parts by mass or more. On the other hand, it is preferably 70 parts by mass or less, more preferably 60 parts by mass or less, and further preferably 50 parts by mass or less.

Carbon black is not particularly limited, and examples thereof include furnace black (furnace carbon black) such as SAF, ISAF, HAF, MAF, FEF, SRF, GPF, APF, FF, CF, SCF and ECF; acetylene black (acetylene carbon black); thermal blacks (thermal carbon blacks) such as FT and MT; channel blacks (channel carbon blacks) such as EPC, MPC and CC. They may be used individually by 1 type, and may use 2 or more types together.

The CTAB (Cetyl Tri-methyl Ammonium Bromide) specific surface area of carbon black is preferably 130 m²/g or more, more preferably 160 m²/g or more, and further preferably 170 m²/g or more. On the other hand, it is preferably 250 m²/g or less, and more preferably 200 m²/g or less. The CTAB specific surface area is a value measured according to ASTM D3765-92.

Specific carbon black is not particularly limited, and examples thereof include N134, N110, N220, N234, N219, N339, N330, N326, N351, N550, and N762. Commercially available products include, for example, products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. These may be used alone or in combination of two or more. As the carbon black, in addition to conventional carbon black made from mineral oil, carbon black made from lignin or the like may be used.

(iii) Other Fillers

The rubber composition may further contain fillers such as graphite, calcium carbonate, tale, alumina, clay, aluminum hydroxide, and mica, which are generally used in the tire industry, in addition to the above-mentioned silica and carbon black, as necessary. These contents are, for example, more than 0.1 part by mass and less than 200 parts by mass with respect to 100 parts by mass of the rubber component.

(b-2) Plasticizer Component

The rubber composition may contain oil, liquid rubber, and resin as plasticizer components as components for softening rubber. The plasticizer component is a component that can be extracted from the vulcanized rubber with acetone. The total content of the plasticizer component is preferably 15 parts by mass or more, more preferably 20 parts by mass or more, and further preferably 30 parts by mass or more with respect to 100 parts by mass of the rubber component. On the other hand, it is preferably 55 parts by mass or less, more preferably 50 parts by mass or less, and further preferably 45 parts by mass or less. In addition, when the above-described rubber component contains an extensible rubber, the extensible component is included in the plasticizer component.

(i) Oil

Examples of the oil include mineral oils (commonly referred to as process oils), vegetable oils, or mixtures thereof. As the mineral oil (process oil), for example, a paraffinic process oil such as for example, MES (Mild Extract Solvated), DAE (Distillate Aromatic Extract), TDAE (Treated Distillate Aromatic Extract), TRAE (Treated Residual Aromatic Extract), and RAE (Residual Aromatic Extract), an aroma-based process oil, a naphthene process oil, or the like can be used. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, beni-flower oil, sesame oil, olive oil, sunflower oil, palm kernel oil, *Camellia* oil, jojoba oil, macadamia nut oil, and tung oil. These may be used alone or in combination of two or more. Moreover, from the viewpoint of life cycle assessment, waste oil after being used as a lubricating oil for mixers for rubber mixing, automobile engines, etc., waste cooking oil, and the like may be used as appropriate.

Specific examples of process oil (mineral oil) include products of Idemitsu Kosan Co., Ltd., Sankyo Yuka Kogyo Co., Ltd., ENEOS Corporation, Olisoy Co., Ltd., H&R Co., Ltd., Toyokuni Seiyu Co., Ltd., Showa Shell Sekiyu Co., Ltd., and Fuji Kosan Co., Ltd.

(ii) Liquid Rubber

The liquid rubber mentioned as the plasticizer is a polymer in a liquid state at room temperature (25° C.) and is a polymer having a monomer similar to that of solid rubber as a constituent element. Examples of the liquid rubber include farnesene-based polymers, liquid diene-based polymers, and hydrogenated additives thereof.

The farnesene-based polymer is a polymer obtained by polymerizing farnesene, and has a structural unit based on farnesene. Farnesene includes isomers such as α-farnesene ((3E, 7E)-3,7,11-trimethyl-1,3,6,10-dodecatetraene) and β-farnesene (7,11-dimethyl-3-methylene-1, 6,10-dodecatorien).

The farnesene-based polymer may be a homopolymer of farnesene (farnesene homopolymer) or a copolymer of farnesene and a vinyl monomer (farnesene-vinyl monomer copolymer).

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-converted weight average molecular weight (Mw) measured by gel permeation chromatography (GPC) of, for example, more than $1.0 \times 10^3$ and less than $2.0 \times 10^5$. In the present specification, Mw of the liquid diene polymer is a polystyrene conversion value measured by gel permeation chromatography (GPC).

The content of the liquid rubber (the total content of the liquid farnesene-based polymer, the liquid diene-based polymer, etc.) is, for example, more than 1 part by mass and less than 100 parts by mass with respect to 100 parts by mass of the rubber component.

As the liquid rubber, for example, products of Kuraray Co., Ltd. and Clay Valley Co., Ltd. can be used.

(iii) Resin Component

The resin component also functions as a tackifying component and may be solid or liquid at room temperature. Specific examples of the resin components include rosin-based resin, styrene-based resin, coumarone-based resin, terpene-based resin, C5 resin, C9 resin, C5C9 resin, and acrylic resins. Two or more of them may be used in combination. Content of the resin component is more than 2 parts by mass, preferably less than 45 parts by mass, and more preferably less than 30 parts by mass with respect to 100 parts by mass of the rubber component. These resin components may optionally be provided with modified groups capable of reacting with silica The rosin-based resin is a resin whose main component is rosin acid obtained by processing rosin. The rosin-based resins (rosins) can be classified according to the presence or absence of modification, and can be classified into unmodified rosin (non-modified rosin) and modified rosin (rosin derivative). Unmodified rosins include tall rosin (also known as tall oil rosin), gum rosin, wood rosin, disproportionated rosin, polymerized rosin, hydrogenated rosin, and other chemically modified rosins. The modified rosin is a modified compound of an unmodified rosin, and examples thereof include rosin esters, unsaturated carboxylic acid-modified rosins, unsaturated carboxylic acid-modified rosin esters, rosin amide compounds, and rosin amine salts.

The styrene-based resin is a polymer using a styrene monomer as a constituent monomer, and examples thereof include a polymer obtained by polymerizing a styrene monomer as a main component (50% by mass or more). Specifically, it includes homopolymers obtained by individually polymerizing styrene monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.), copolymers obtained by copolymerizing two or more styrene monomers, and, in addition, copolymers obtained by copolymerizing a styrene monomer and other monomers that can be copolymerized with the styrene monomer.

Examples of the other monomers include acrylonitriles such as acrylonitrile and methacrylonitrile; unsaturated carboxylic acids such as acrylic acid and methacrylic acid; unsaturated carboxylic acid esters such as methyl acrylate and methyl methacrylate: dienes such as chloroprene, butadiene, and isoprene, olefins such as 1-butene and 1-pentene; and α, β-unsaturated carboxylic acids such as maleic anhydride and acid anhydrides thereof.

As the coumarone-based resin, coumarone-indene resin is preferably used. Coumarone-indene resin is a resin containing coumarone and indene as monomer components constituting the skeleton (main chain) of the resin. Examples of the monomer component contained in the skeleton other than coumarone and indene include styrene, α-methylstyrene, methylindene, and vinyltoluene.

The content of the coumarone-indene resin is, for example, more than 1.0 part by mass and less than 50.0 parts by mass with respect to 100 parts by mass of the rubber component.

The hydroxyl value (OH value) of the coumarone-indene resin is, for example, more than 15 mgKOH/g and less than 150 mgKOH/g. The OH value is the amount of potassium hydroxide required to neutralize acetic acid bonded to a hydroxyl group when 1 g of the resin is acetylated, and is expressed in milligrams. It is a value measured by potentiometric titration method (JIS K 0070: 1992).

The softening point of the coumarone-indene resin is, for example, higher than 30° C. and lower than 160° C. The softening point is the temperature at which the ball drops when the softening point defined in JIS K 6220-1: 2001 is measured by a ring-ball type softening point measuring device.

Examples of the terpene-based resins include polyterpenes, terpene phenols, and aromatic-modified terpene resins. Polyterpene is a resin obtained by polymerizing a terpene compound and a hydrogenated product thereof. The terpene compound is a hydrocarbon having a composition of $(C_5H_8)$ n or an oxygen-containing derivative thereof, which is a compound having a terpene classified as monoterpenes $(C_{10}H_{16})$, sesquiterpenes $(C_{15}H_{24})$, diterpenes $(C_{20}H_{32})$, etc. as the basic skeleton. Examples thereof include α-pinene, β-pinene, dipentene, limonene, myrcene, alloocimene, osimene, α-phellandrene, α-terpinene, γ-terpinene, terpinolene, 1,8-cineol, 1,4-cineol, α-terpineol, β-terpineol, and γ-terpineol.

Examples of the polyterpene include terpene resins such as α-pinene resin, 6-pinene resin, limonene resin, dipentene resin, and β-pinene/limonene resin, which are made from the above-mentioned terpene compound, as well as hydrogenated terpene resin obtained by hydrogenating the terpene resin. Examples of the terpene phenol include a resin obtained by copolymerizing the above-mentioned terpene compound and the phenol compound, and a resin obtained by hydrogenating above-mentioned resin. Specifically, a resin obtained by condensing the above-mentioned terpene compound, the phenol compound and formalin can be mentioned. Examples of the phenol compound include phenol, bisphenol A, cresol, and xylenol. Examples of the aromatic-modified terpene resin include a resin obtained by modifying a terpene resin with an aromatic compound, and a resin obtained by hydrogenating the above-mentioned resin. The aromatic compound is not particularly limited as long as it is a compound having an aromatic ring, and examples thereof include phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthols; styrene derivatives such as styrene, alkylstyrene, alkoxystyrene, unsaturated hydrocarbon group-containing styrene; coumarone; and indene.

The "C5 resin" refers to a resin obtained by polymerizing a C5 fraction. Examples of the C5 fraction include petroleum fractions having 4 to 5 carbon atoms such as cyclopentadiene, pentene, pentadiene, and isoprene. As the C5 based petroleum resin, a dicyclopentadiene resin (DCPD resin) is preferably used.

The "C9 resin" refers to a resin obtained by polymerizing a C9 fraction, which may be hydrogenated or modified. Examples of the C9 fraction include petroleum fractions having 8 to 10 carbon atoms such as vinyltoluene, alkylstyrene, indene, and methyl indene. As specific examples thereof, for example, a coumaron indene resin, a coumaron resin, an indene resin, and an aromatic vinyl resin are preferably used. As the aromatic vinyl resin, a homopolymer of α-methylstyrene or styrene or a copolymer of α-methylstyrene and styrene is preferable because it is economical, easy to process, and excellent in heat generation. A copolymer of α-methylstyrene and styrene is more preferred. As the aromatic vinyl-based resin, for example, those commercially available from Kraton Co., Ltd., Eastman Chemical Co., Ltd., etc. can be used.

The "C5-C9 resin" refers to a resin obtained by copolymerizing the C5 fraction and the C9 fraction, which may be hydrogenated or modified. Examples of the C5 fraction and the C9 fraction include the above-mentioned petroleum fraction. As the C5-C9 resin, for example, those commercially available from Tosoh Corporation, LUHUA, etc. can be used.

The acrylic resin is not particularly limited, but for example, a solvent-free acrylic resin can be used.

As the solvent-free acrylic resin, a (meth) acrylic resin (polymer) synthesized by a high-temperature continuous polymerization method (high-temperature continuous lump polymerization method (a method described in U.S. Pat. No. 4,414,370 B, JP 84-6207 A, JP 93-58805 B, JP 89-313522 A, U.S. Pat. No. 5,010,166 B, Toa Synthetic Research Annual Report TREND2000 No. 3 p 42-45, and the like) without using polymerization initiators, chain transfer agents, organic solvents, etc. as auxiliary raw materials as much as possible, can be mentioned. In the present invention, (meth) acrylic means methacrylic and acrylic.

Examples of the monomer component constituting the acrylic resin include (meth) acrylic acid, and (meth) acrylic acid derivatives such as (meth) acrylic acid ester (alkyl ester, aryl ester, aralkyl ester, etc.), (meth) acrylamide, and (meth) acrylamide derivative.

In addition, as the monomer component constituting the acrylic resin, aromatic vinyl compounds such as styrene, α-methylstyrene, vinyltoluene, vinylnaphthalene, divinylbenzene, trivinylbenzene, divinylnaphthalene, and the like may be used, together with (meth) acrylic acid or (meth) acrylic acid derivative.

The acrylic resin may be a resin composed of only a (meth) acrylic component or a resin also having a component other than the (meth) acrylic component. Further, the acrylic resin may have a hydroxyl group, a carboxyl group, a silanol group, or the like.

As the resin component, for example, a product of Maruzen Petrochemical Co., Ltd., Sumitomo Bakelite Co., Ltd., Yasuhara Chemical Co., Ltd., Toso Co., Ltd., Rutgers Chemicals Co., Ltd., BASF Co., Ltd., Arizona Chemical Co., Ltd., Nitto Chemical Co., Ltd., Co., Ltd., Nippon Catalyst Co., Ltd., ENEOS Co., Ltd., Arakawa Chemical Industry Co., Ltd., Taoka Chemical Industry Co., Ltd. can be used.

(b-3) Stearic Acid

In the present invention, the rubber composition preferably contains stearic acid. Content of stearic acid is, for example, more than 0.5 parts by mass and less than 10.0 parts by mass with respect to 100 parts by mass of the rubber component. As the stearic acid, conventionally known ones can be used, and, for example, products of NOF Corporation, Kao Corporation, Fuji film Wako Pure Chemical Industries, Ltd., and Chiba Fatty Acid Co., Ltd., etc. can be used.

(b-4) Anti-Aging Agent

In the present invention, the rubber composition preferably contains an antioxidant. The content of the anti-aging agent is, for example, more than 0.5 parts by mass and less than 10 parts by mass, and more preferably 1 part by mass or more with respect to 100 parts by mass of the rubber component.

Examples of the antiaging agent include naphthylamine-based antiaging agents such as phenyl-α-naphthylamine; diphenylamine-based antiaging agents such as octylated diphenylamine and 4,4'-bis (α, α'-dimethylbenzyl) diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, styrenated phenol; bis, tris, polyphenolic anti-aging agents such as tetrakis-[methylene-3-(3',5'-di-t-butyl-4'-hydroxyphenyl)propionate]methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexsys Co., Ltd., etc. can be used.

(b-5) Wax

In the present invention, the rubber composition preferably contains wax. Content of the wax is, for example, 0.5 to 20 parts by mass, preferably 1.0 to 15 parts by mass, and more preferably 1.5 to 10 parts by mass with respect to 100 parts by mass of the rubber component.

The wax is not particularly limited, and examples thereof include petroleum waxes such as paraffin wax and microcrystalline wax; natural waxes such as plant waxes and animal waxes; synthetic waxes such as polymers of ethylene and propylene. These may be used alone or in combination of two or more.

As the wax, for example, products of Ouchi Shinko Chemical Industry Co., Ltd., Nippon Seiro Co., Ltd., Seiko Chemical Co., Ltd., etc. can be used.

(b-6) Zinc Oxide

The rubber composition may contain zinc oxide. Content of the zinc oxide is, for example, more than 0.5 parts by mass and less than 10 parts by mass with respect to 100 parts by mass of the rubber component. As the zinc oxide, conventionally known ones can be used, for example, products of Mitsui Mining & Smelting Co., Ltd., Toho Zinc Co., Ltd., Hakusui Tech Co., Ltd., Shodo Chemical Industry Co., Ltd., Sakai Chemical Industry Co., Ltd., etc. can be used.

(b-7) Dispersant

The rubber composition may contain a dispersant. When used in combination with silica, silica can be sufficiently dispersed in the rubber matrix. The content of the dispersant is preferably more than 0.5 parts by mass and less than 10 parts by mass, and more preferably 1 part by mass or more and 5 parts by mass or less with respect to 100 parts by mass of the rubber component.

The amine compounds described above can be mentioned as examples of the dispersant. Also, for example, silane compounds such as alkoxysilanes including hexyltrimethoxysilane, phenyltrimethoxysilane, phenyltriethoxysilane, diphenyldimethoxysilane, and the like can be mentioned. As a commercial product, KBE-103 (phenyltriethoxysilane) manufactured by Shin-Etsu Chemical Co., Ltd., etc. can be used.

(b-8) Cross-Linking Agent and Vulcanization Accelerator

The rubber composition preferably contains a cross-linking agent such as sulfur. Content of the cross-linking agent is, for example, more than 0.1 parts by mass and less than 10.0 parts by mass with respect to 100 parts by mass of the rubber component.

Examples of sulfur include powdered sulfur, precipitated sulfur, colloidal sulfur, insoluble sulfur, highly dispersible sulfur, and soluble sulfur, which are commonly used in the rubber industry. These may be used alone or in combination of two or more.

As the sulfur, for example, products of Tsurumi Chemical Industry Co., Ltd., Karuizawa Sulfur Co., Ltd., Shikoku Chemicals Corporation, Flexsys Co., Ltd., Nippon Kanryu Kogyo Co., Ltd., Hosoi Chemical Industry Co., Ltd., etc. can be used.

Examples of the cross-linking agent other than sulfur include vulcanizing agents containing a sulfur atom such as Tackirol V200 manufactured by Taoka Chemical Industry Co., Ltd., and KA9188 (1,6-bis (N, N'-dibenzylthiocarbamoyldithio) hexane) manufactured by Lanxess; and organic peroxides such as dicumyl peroxide.

The rubber composition preferably contains a vulcanization accelerator. The content of the vulcanization accelerator is, for example, more than 0.3 parts by mass and less than 10.0 parts by mass with respect to 100 parts by mass of the rubber component.

Examples of the vulcanization accelerator include

- thiazole-based vulcanization accelerators such as 2-mercaptobenzothiazole, di-2-benzothiazolyl disulfide, and N-cyclohexyl-2-benzothiadylsulfenamide;
- thiuram-based vulcanization accelerators such as tetramethylthiuram disulfide (TMTD), tetrabenzyltiuram disulfide (TBzTD), and tetrakis (2-ethylhexyl) thiuram disulfide (TOT-N);
- sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, and N,N'-diisopropyl-2-benzothiazolesulfenamide; and
- guanidine-based vulcanization accelerators such as diphenylguanidine, di-ortho-tolylguanidine and ortho-tolylbiguanidine. These may be used alone or in combination of two or more.

(b-9) Others

In addition to the above components, the rubber composition may contain additives commonly used in the tire industry, such as fatty acid metal salts, carboxylic acid metal salts, organic peroxides, anti-reversion agents may be further contained, if desired. Content of these additives is, for example, more than 0.1 parts by mass and less than 200 parts by mass with respect to 100 parts by mass of the rubber component.

(2) Production of Rubber Composition

The rubber composition forming the cap rubber layer is prepared by appropriately adjusting the various compounding materials described above and performing a general method, for example, a manufacturing method having a base kneading step of kneading a rubber component and a filler such as carbon black, and a finish kneading step of kneading the kneaded product obtained in the base kneading step and a cross-linking agent.

Kneading can be performed using, for example, a known (closed) kneader such as a Banbury mixer, kneader, and open roll.

The kneading temperature in the base kneading step is, for example, higher than 50° C. and lower than 200° C., and the kneading time is, for example, more than 30 seconds and less than 30 minutes. In the base kneading step, in addition to the above components, compounding agents conventionally used in the rubber industry, such as plasticizers such as oils, zinc oxide, anti-aging agents, waxes, and vulcanization accelerators, may be appropriately added and kneaded as desired. The order in which the materials are added during mixing is not particularly limited. The filler and softening agent may be added after the rubber component has been pulverized in the mixer, or the rubber component may be added after the filler and softening agent were mixed in the mixer.

In the finish kneading step, the kneaded material obtained in the base kneading step and a cross-linking agent are kneaded. The kneading temperature in the finish kneading step is, for example, higher than room temperature and lower than 80° C., and the kneading time is, for example, more than 1 minute and less than 15 minutes. In the finish kneading step, in addition to the above components, a vulcanization accelerator, zinc oxide, and the like may be appropriately added and kneaded as desired.

2. Manufacture of Tires

The tire according to the present invention can be produced as an unvulcanized tire by forming a tread rubber having a predetermined shape using the rubber composition obtained above as a cap rubber layer, and then forming the tire together with other tire members by an ordinary method on a tire molding machine.

When the tread portion is to have a multi-layered structure with the base rubber layer, a rubber composition forming a base rubber layer can be obtained, basically, by using the above-described rubber component and compounding materials, appropriately changing the compounding amount, and kneading in the same manner. Then, it is extruded together with the cap rubber layer and molded into a tread rubber of a predetermined shape, and then molded together with other tire members on a tire molding machine by a normal method to produce an unvulcanized tire.

Specifically, on the molded drum, the inner liner as a member to ensure the airtightness of the tire, the carcass as a member to withstand the load, impact, and filling air pressure received by the tire, a belt member as a member to strongly tighten the carcass to increase the rigidity of the tread, and the like are wound, both ends of the carcass are fixed to both side edges, a bead portion as a member for fixing the tire to the rim is arranged, and formed into a toroid shape. Then the tread is pasted on the center of the outer circumference, and the sidewall is pasted on the radial outer side to form the side portion. Thus, an unvulcanized tire is produced.

Then, the produced unvulcanized tire is heated and pressed in a vulcanizer to obtain a tire. The vulcanization step can be carried out by applying a known vulcanization means. The vulcanization temperature is, for example, higher than 120° C. and lower than 200° C., and the vulcanization time is, for example, more than 5 minutes or and less than 15 minutes As described above, the obtained tire has the cap rubber layer which itself easily absorbs deformation and is formed with high strength, and the thickness of the tread portion is reduced to suppress the amount of rubber deformation and heat accumulation, and maintain a state of high strength during rolling. As a result, sufficient chipping resistance performance can be exhibited even when running on rough roads at high speed.

The tire according to the present invention is not particularly limited in category, and can be used as a tire for passenger cars, a tire for heavy-duty vehicles such as trucks and buses, a tire for motorcycles, a run-flat tire, a non-pneumatic tire, and the like, although it is preferable to use for a heavy-duty vehicle. Moreover, it is preferable to set it as a pneumatic tire.

EXAMPLE

Examples that are considered to be preferable when implementing the present invention are shown below, but the scope of the present invention is not limited to these examples. In the examples, pneumatic tires (tire size 235/65R18 (aspect ratio: 65%, land ratio: 60%)) made from a composition obtained by using various chemicals shown below and changing the composition according to each table were investigated. The results calculated based on the following evaluation methods are shown in Tables 2 to 4.

1. Rubber Composition Forming Cap Rubber Layer (1) Compounding Material (a) Rubber Component

- (a-1) SBR-1: Modified S-SBR obtained by the method shown in the next paragraph (styrene content: 25% by mass, vinyl content: 25% by mass)
- (a-2) SBR-2: HPR840 (modified S-SBR) manufactured by ENEOS Material Co., Ltd (styrene content: 10% by mass, vinyl content: 42% by mass)
- (a-3) SBR-3: HPR850 (modified S-SBR) manufactured by ENEOS Material Co., Ltd (styrene content: 27.5% by mass, vinyl content: 59.0% by mass)
- (a-4) NR: TSR20
- (a-5) BR: Ubepol BR150B (Hicis BR) manufactured by Ube Industries, Ltd. (cis content: 97% by mass, trans content 2% by mass, vinyl content 1% by mass)

(Manufacture of SBR-1)

The above SBR-1 is produced according to the following procedure. First, two autoclaves having an internal volume of 10 L, having an inlet at the bottom and an outlet at the top, equipped with a stirrer and a jacket, were connected in series as reactors. Butadiene, styrene, and cyclohexane were each mixed in a predetermined ratio. This mixed solution is passed through a dehydration column filled with activated alumina, mixed with n-butyllithium in a static mixer to remove impurities. Then, it is continuously supplied from the bottom of the first reactor, further 2,2-bis(2-oxolanyl) propane as a polar substance and n-butyllithium as a polymerization initiator are continuously supplied at a predetermined rate from the bottom of the first reactor, and the internal temperature of the reactor is kept at 95° C. The polymer solution is continuously withdrawn from the top of the first reactor and supplied to the second reactor. The temperature of the second reactor is kept at 95° C., and a mixture of tetraglycidyl-1,3-bisaminomethylcyclohexane (monomer) as a modifier and an oligomer component is continuously added, as a 1000-fold dilution of cyclohexane, at a predetermined rate to carry out the denaturation reaction. This polymer solution is continuously withdrawn from the reactor, an antioxidant is added continuously by a static mixer, and the solvent is removed to obtain the desired modified diene polymer (SBR-1).

The vinyl content (unit: % by mol) of the SBR-1 is determined by infrared spectroscopy from the absorption intensity near 910 cm-1, which is the absorption peak of the vinyl group. Also, the styrene content (unit: % by mass) is determined from the refractive index according to JIS K6383: 1995).

(b) Compounding Materials Other than Rubber Components (b-1) Carbon black: Show Black N134 manufactured by Cabot Japan Co., Ltd. (CTAB specific surface area: 135 $m^2/g$)

(b-2) Silica-1: Ultrasil VN3 manufactured by Evonik Industries (N2SA: 175 $m^2/g$, average particle size: 18 nm)

(b-3) Silica-2: Ultrasil 9100Gr manufactured by Evonik Industries (N2SA: 235 $m^2Ig$, average particle size: fine particle silica of 15 nm)

(b-4) Silane coupling agent-1: Si266 manufactured by Evonik Industries (bis (3-triethoxysilylpropyl) disulfide)

(b-5) Silane coupling agent-2: NXT manufactured by Momentive Co., Ltd. (3-octanoylthiopropyltriethoxysilane)

(b-6) Resin: Petrotac 90 (C5/C9 copolymer petroleum resin) manufactured by Tosoh Corporation (b-7) Dispersant: Liponol HT/14 manufactured by Lion Specialty Chemicals Co., Ltd. (polyoxyethylene alkyl (C14-C18) amine (4E.O.)

(b-8) Oil: Diana Process AH-24 (aroma oil) manufactured by Idemitsu Kosan Co., Ltd.

(b-9) Wax: Sannok N manufactured by Ouchi Shinko Chemical Industry Co., Ltd.

(b-10) Anti-aging agent-1: Antigen 6C manufactured by Sumitomo Chemical Co., Ltd. (N-(1,3-dimethylbutyl)-N'-phenyl-p-phenylenediamine)

(b-11) Anti-aging agent-2: Antigen RD manufactured by Sumitomo Chemical Co., Ltd. (Polymer of 2,2,4-trimethyl-1,2-dihydroquinoline)

(b-12) Stearic acid: bead stearic acid "Tsubaki" manufactured by NOF Corporation (b-13) Zinc oxide: Two types of zinc oxide manufactured by Mitsui Mining & Smelting Co., Ltd.

(b-14) Sulfur: powdered sulfur (containing 5% oil) manufactured by Tsurumi Chemical Industry Co., Ltd.

(b-15) Vulcanization accelerator-1: Nocceler CZ manufactured by Ouchi Shinko Chemical Industry Co., Ltd. (N-cyclohexyl-2-benzothiazylsulfenamide (CBS))

(b-16) Vulcanization accelerator-2: Soxinol D (DPG) manufactured by Sumitomo Chemical Co., Ltd. (N,N'-diphenylguanidine)

(2) Rubber Composition Forming Cap Rubber Layer

Using a Banbury mixer, materials other than sulfur and a vulcanization accelerator are kneaded at 150° C. for 5 minutes according to the formulations shown in Tables 2 to 4 to obtain a kneaded product. Note that, each compounding quantity is a mass part.

Next, sulfur and a vulcanization accelerator are added to the kneaded product, and kneaded at 80° C. for 5 minutes using an open roll to obtain a rubber composition forming a cap rubber layer.

2. Manufacture of Rubber Composition Forming Base Rubber Layer

In parallel, a rubber composition for forming the base rubber layer is obtained based on the formulation shown in Table 1 in the same manner as the rubber composition for forming the cap rubber layer.

TABLE 1

| Compounding material | Compounding amount (parts by mass) |
|---|---|
| NR (TSR20) | 70 |
| BR (UBEPOL-BR150B manufactured by Ube Industries, Ltd.) | 30 |
| Carbon black (Show Black N330T manufactured by Cabot Japan Co., Ltd.) | 35 |
| Stearic acid ("Tsubaki" stearic acid manufactured by NOF Corporation) | 2 |
| Zinc oxide (Zinc white No. 1 manufactured by Mitsui Mining & Smelting Co., Ltd.) | 4 |
| Wax (Sannok wax manufactured by Ouchi Shinko Chemical Co., Ltd.) | 2 |
| Antiaging agent (Nocrac 6C manufactured by Ouchi Shinko Chemical Industry Co., Ltd) | 3 |
| Antiaging agent (Antage RD manufactured by Kawaguchi Chemical Industry Co., Ltd.) | 1 |
| Sulfur (powder sulfur manufactured by Tsurumi Chemical Industry Co., Ltd.) | 1.7 |
| Vulcanization accelerator (Nocceler CZ-G manufactured by Ouchi Shinko Chemical Industry Co., Ltd.) | 1.2 |

3. Manufacture of Cap Rubber and Pneumatic Tires

Using each rubber composition, the tread portion is manufactured by extruding into a predetermined shape so that the ratio of thickness of the vulcanized cap rubber layer to thickness of the base rubber layer is 70/30 and the tread thickness is 12 mm and 10 mm.

After that, an unvulcanized tire was formed by pasting the tread portion together with other tire members, press vulcanized for 10 minutes at 170° C., and each pneumatic tire (test tire) of Examples 1 to 14 and Comparative examples 1 to 7 shown in Tables 2 to 4 is manufactured.

4. Calculation of Parameters

The following parameters are then determined for each test tire.

(1) 30° C. Tan δ

From the cap rubber layer of the tread portion of each test tire, a rubber test piece for viscoelasticity measurement was prepared by cutting a size of length 20 mm×width 4 mm×thickness 2 mm so that the tire circumferential direction is the long side. For the rubber test piece, tan δ is measured using Eplexor series manufactured by GABO under the conditions of measurement temperature of 30° C., frequency of 10 Hz, initial strain of 5%, dynamic strain of 1%, and deformation mode: tensile. The thickness direction of the sample is the radial direction of the tire. The 30° C. tan δ of the base rubber layer is 0.07.

(2) Tg

Regarding a rubber test piece for viscoelasticity measurement prepared by cutting out from the cap rubber layer, tan δ is measured under the conditions of a frequency of 10 Hz, an initial strain of 2%, an amplitude of 1%, and a heating rate of 2° C./min, changing the temperature from −60° C. to 40° C., using "Eplexor (registered trademark)" manufactured by GABO. The temperature corresponding to the largest tan δ value in the obtained temperature distribution curve is determined as Tg (° C.).

(3) M100

A No. 7 dumbbell-shaped test piece with a thickness of 1 mm is prepared from a sample taken from the cap rubber layer of each test tire, and a tensile test is performed at 23° C. in accordance with JIS K6251: 2010 to measure modulus at 100% elongation (M100: MPa).

(4) AE

Using a vulcanized rubber test piece prepared by cutting out from the cap rubber layer of the tread portion of each test tire, AE (% by mass) is determined according to JIS K 6229:2015.

(5) Other Parameters

In addition, silica content/carbon black content (silica/CB), 30° C. tan δ/tread thickness, M100 (MPa)/tread thickness, product of SBR content with styrene content of 25% by mass or less and land ratio (SBR content×land ratio) and silica content×aspect ratio in each test tire are calculated.

5. Performance Evaluation (Chipping Resistance Performance)

Each test tire is installed on all wheels of a vehicle (displacement 2000 cc, front-wheel drive vehicle), and filled with air to the standardized internal pressure). Then the vehicle is driven 10 laps (100 km) on a rough road test course that simulates rocky terrain. The number and size of chipped blocks generated in the tread portion of the tire are measured. The results are indexed based on the following formula by setting the result in Comparative Example 1 to 100, and chipping resistance performance is evaluated. A larger value indicates better chipping resistance performance.

Chipping resistance performance=[(result of Comparative Example 1)/(result of test tire)]×100

TABLE 2

| | EXAMPLE | | | | | | |
|---|---|---|---|---|---|---|---|
| Example No. | 1 | 2 | 3 | 4 | 5 | 6 | 7 |
| **Formulation of cap rubber** | | | | | | | |
| SBR-1 | 40 | 60 | — | 60 | 60 | — | 60 |
| SBR-2 | — | — | 60 | — | — | 60 | 1 |
| SBR-3 | — | — | — | — | — | — | — |
| NR | — | — | — | — | — | — | — |
| BR | 60 | 40 | 40 | 40 | 40 | 40 | 40 |
| Carbon black | 30 | 40 | 40 | 40 | 45 | 45 | 45 |
| Silica-1 | 50 | 50 | 50 | 50 | — | — | 60 |
| Silica-2 | — | — | — | — | 50 | 50 | — |
| Coupling agent-1 | — | 5 | 5 | 5 | 5 | 5 | 6 |
| Coupling agent-2 | 5 | — | — | — | — | — | — |
| Resin | 23 | 15 | 20 | 15 | 15 | 20 | 15 |
| Dispersant | — | — | — | — | — | — | 2 |
| Oil | 10 | 5 | 5 | 5 | 17 | 17 | 17 |
| WAX | 2 | 2 | 2 | 2 | 2 | 2 | 2 |
| Anti-aging agent-1 | 2 | 2 | 2 | 2 | 2 | 2 | 2 |
| Anti-aging agent-2 | 1 | 1 | 1 | 1 | 1 | 1 | 1 |
| Stearic acid | 2 | 2 | 2 | 2 | 2 | 2 | 2 |
| Zinc oxide | 2 | 2 | 2 | 2 | 2 | 2 | 2 |
| Sulfur | 1.2 | 1.2 | 1.2 | 1.5 | 1.3 | 1.3 | 1.3 |
| Vulcanization accelerator-1 | 2.3 | 2.3 | 2.3 | 2.7 | 2.5 | 2.5 | 2.5 |
| Vulcanization accelerator-2 | 1.5 | 1.5 | 1.5 | 1.9 | 1.5 | 1.5 | 1.5 |
| **Parameter** | | | | | | | |
| 30° C. tan δ | 0.29 | 0.31 | 0.31 | 0.31 | 0.33 | 0.33 | 0.35 |
| Silica amount/CB amount | 1.7 | 1.3 | 1.3 | 1.3 | 1.1 | 1.1 | 1.3 |
| Tread thickness (mm) | 12 | 12 | 12 | 12 | 12 | 12 | 12 |
| 30° C. tan δ/tread thickness (mm) | 0.024 | 0.026 | 0.026 | 0.026 | 0.028 | 0.028 | 0.029 |
| Tg (° C.) | −41 | −41 | −41 | −40 | −42 | −42 | −40 |
| M100 (MPa) | 1.5 | 2.4 | 2.6 | 2.6 | 2.1 | 2.1 | 2.3 |
| M100(MPa)/tread thickness (mm) | 0.13 | 0.20 | 0.22 | 0.22 | 0.18 | 0.18 | 0.19 |
| AE (% by mass) | 14.2 | 8.7 | 10.6 | 8.7 | 13 | 14.7 | 12.3 |
| SBR content (parts by mass) × land ratio (%) | 2400 | 3600 | 3600 | 3600 | 3600 | 3600 | 3600 |
| Silica content (parts by mass) × Aspect ratio (%) | 3250 | 3250 | 3250 | 3250 | 3250 | 3250 | 3900 |
| **Performance evaluation** | | | | | | | |
| Chipping resistance performance | 105 | 115 | 118 | 118 | 122 | 124 | 120 |

TABLE 3

| | EXAMPLE | | | | | | |
|---|---|---|---|---|---|---|---|
| Example No. | 8 | 9 | 10 | 11 | 12 | 13 | 14 |
| Formulation of cap rubber | | | | | | | |
| SBR-1 | 60 | 80 | 60 | — | 60 | 60 | 80 |
| SBR-2 | — | — | — | 60 | — | — | — |
| SBR-3 | — | — | — | — | — | — | — |
| NR | — | — | — | — | — | — | — |
| BR | 40 | 20 | 40 | 40 | 40 | 40 | 20 |
| Carbon black | 40 | 40 | 40 | 40 | 60 | 15 | 15 |
| Silica-1 | 50 | 50 | 50 | 50 | 60 | 60 | 50 |
| Silica-2 | — | — | — | — | — | — | — |
| Coupling agent-1 | 5 | 5 | 5 | 5 | 5 | 6 | 5 |
| Coupling agent-2 | — | — | — | — | — | — | — |
| Resin | 15 | 15 | 15 | 20 | 15 | — | — |
| Dispersant | — | — | — | — | — | — | — |
| Oil | 5 | 5 | 5 | 5 | 5 | 5 | — |
| WAX | 2 | 2 | 2 | 2 | 2 | 2 | 2 |
| Anti-aging agent-1 | 2 | 2 | 2 | 2 | 2 | 2 | 2 |
| Anti-aging agent-2 | 1 | 1 | 1 | 1 | 1 | 1 | 1 |
| Stearic acid | 2 | 2 | 2 | 2 | 2 | 2 | 2 |
| Zinc oxide | 2 | 2 | 2 | 2 | 2 | 2 | 2 |
| Sulfur | 1.2 | 1.2 | 1.2 | 1.2 | 1.2 | 1.2 | 1.4 |
| Vulcanization accelerator-1 | 2.8 | 2.3 | 2.3 | 2.3 | 2.3 | 3.5 | 1 |
| Vulcanization accelerator-2 | 1.5 | 1.5 | 1.5 | 1.5 | 1.5 | 2.5 | 2.5 |
| Parameter | | | | | | | |
| 30° C. tan δ | 0.31 | 0.29 | 0.31 | 0.31 | 0.4 | 0.26 | 0.19 |
| Silica amount/CB amount | 1.3 | 1.3 | 1.3 | 1.3 | 1 | 4 | 3.3 |
| Tread thickness (mm) | 12 | 12 | 10 | 10 | 15 | 10 | 10 |
| 30° C. tan δ/tread thickness (mm) | 0.026 | 0.024 | 0.031 | 0.031 | 0.027 | 0.026 | 0.027 |
| Tg (° C.) | −41 | −37 | −41 | −41 | −41 | −36 | −29 |
| M100 (MPa) | 2.4 | 2.3 | 2.4 | 2.6 | 2.4 | 2.8 | 2.7 |
| M100 (MPa)/tread thickness (mm) | 0.20 | 0.19 | 0.24 | 0.26 | 0.2 | 0.28 | 0.27 |
| AE (% by mass) | 8.7 | 8.1 | 8.7 | 10.6 | 8.7 | 9.7 | 11.7 |
| SBR content (parts by mass) × land ratio (%) | 3600 | 4800 | 3600 | 3600 | 3600 | 3600 | 4800 |
| Silica content (parts by mass) × Aspect ratio (%) | 3250 | 5850 | 5850 | 5850 | 3250 | 3900 | 3250 |
| Performance evaluation | | | | | | | |
| Chipping resistance performance | 123 | 121 | 126 | 128 | 124 | 128 | 130 |

40

TABLE 4

| | COMPARATIVE EXAMPLE | | | | | | |
|---|---|---|---|---|---|---|---|
| Comparative example No. | 1 | 2 | 3 | 4 | 5 | 6 | 7 |
| Formulation of cap rubber | | | | | | | |
| SBR-1 | 30 | 80 | 80 | 60 | 60 | — | 60 |
| SBR-2 | — | — | — | — | — | — | — |
| SBR-3 | — | — | — | — | — | 80 | — |
| NR | 30 | — | — | — | — | — | — |
| BR | 40 | 20 | 20 | 40 | 40 | 20 | 40 |
| Carbon black | 30 | 25 | 50 | 10 | 40 | 10 | 40 |
| Silica-1 | 50 | 30 | 20 | 60 | 50 | 40 | 50 |
| Silica-2 | — | — | — | — | — | — | — |
| Coupling agent-1 | 5.0 | 3.0 | 2.0 | 6.0 | 5.0 | — | 5 |
| Coupling agent-2 | — | — | — | — | — | 4.0 | 1 |
| Resin | 15 | 20 | 24 | 10 | 15 | 14 | 15 |
| Dispersant | — | — | — | — | — | — | — |
| Oil | 5 | 0 | 5 | 5 | 5 | — | 5 |
| WAX | 2 | 2 | 2 | 2 | 2 | 2 | 2 |
| Anti-aging agent-1 | 2 | 2 | 2 | 2 | 2 | 2 | 2 |
| Anti-aging agent-2 | 1 | 1 | 1 | 1 | 1 | 1 | 1 |
| Stearic acid | 2 | 2 | 2 | 2 | 2 | 2 | 2 |
| Zinc oxide | 2 | 2 | 2 | 2 | 2 | 2 | 2 |

TABLE 4-continued

| | COMPARATIVE EXAMPLE | | | | | | |
|---|---|---|---|---|---|---|---|
| Comparative example No. | 1 | 2 | 3 | 4 | 5 | 6 | 7 |
| Sulfur | 1.2 | 1.4 | 1.4 | 1.4 | 1.2 | 1.3 | 1.2 |
| Vulcanization accelerator-1 | 2.3 | 2.3 | 2.3 | 2.3 | 2.3 | 2.5 | 2.3 |
| Vulcanization accelerator-2 | 1.5 | 1.3 | 1.0 | 1.9 | 1.5 | 1.5 | 1.5 |
| Parameter | | | | | | | |
| 30° C. tan δ | 0.27 | 0.18 | 0.17 | 0.22 | 0.30 | 0.15 | 0.31 |
| Silica amount/CB amount | 1.7 | 1.2 | 0.4 | 6.0 | 1.3 | 4.0 | 1.31 |
| Tread thickness (mm) | 10 | 7 | 7 | 7 | 7 | 7 | 17 |
| 30° C. tan δ/tread thickness (mm) | 0.027 | 0.026 | 0.024 | 0.031 | 0.043 | 0.021 | 0.018 |
| Tg (° C.) | −44 | −40 | −38 | −40 | −39 | −8 | −41 |
| M100 (MPa) | 2.10 | 2.00 | 2.20 | 2.10 | 1.90 | 1.60 | 2.4 |
| M100(MPa)/tread thickness(mm) | 0.21 | 0.29 | 0.31 | 0.30 | 0.27 | 0.23 | 0.2 |
| AE (% by mass) | 9.1 | 10.4 | 13.5 | 7.3 | 8.7 | 7.7 | 8.7 |
| SBR content (parts by mass) × land ratio (%) | 1800 | 4800 | 4800 | 3600 | 3600 | 0 | 3600 |
| Silica content (parts by mass) × Aspect ratio (%) | 3250 | 1950 | 1300 | 3900 | 3250 | 2600 | 3250 |
| Performance evaluation | | | | | | | |
| Chipping resistance performance | 100 | 88 | 83 | 80 | 98 | 78 | 75 |

Although the present invention has been described above based on the embodiments, the present invention is not limited to the above embodiments. Various modifications can be made to the above embodiment within the same and equivalent scope of the present invention.

The present invention (1) is a tire having a tread portion with a thickness of 15 mm or less, wherein the cap rubber layer forming the tread portion is formed from a rubber composition containing 40 parts by mass or more and 80 parts by mass or less of styrene-butadiene rubber (SBR) with a styrene content of 25% by mass or less, in 100 parts by mass of the rubber component, and in addition to the rubber component, containing silica and carbon black; and having loss tangent 30° C. tan δ of more than 0.18 measured under the conditions of temperature of 30° C., frequency of 10 Hz, initial strain of 5%, dynamic strain rate of 1%, and deformation mode: tensile; wherein the carbon black content is 15 parts by mass or more with respect to 100 parts by mass of the rubber component, and the ratio of the silica content to the carbon black content is 1 or more.

The present invention (2) is the tire according to the present invention (1), wherein the 30° C. tan δ is 0.24 or more.

The present invention (3) is the tire according to the present invention (1) or (2), wherein the content of the carbon black is 30 parts by mass or more with respect to 100 parts by mass of the rubber component.

The present invention (4) is the tire of any combination of the present inventions (1) to (3), wherein the rubber composition constituting the cap rubber layer has a glass transition temperature Tg (° C.) of −45° C. or higher and −10° C. or lower.

The present invention (5) is the tire according to the present invention (4), wherein the rubber composition constituting the cap rubber layer has a glass transition temperature Tg (° C.) of −40° C. or higher and −30° C. or lower.

The present invention (6) is the tire of any combination of the present inventions (1) to (5), wherein 100% modulus (M100) of the rubber composition constituting the cap rubber layer is more than 2.0 MPa.

The present invention (7) is the tire according to the present invention (6), wherein the 100% modulus (M100) of the rubber composition constituting the cap rubber layer is more than 2.2 MPa.

The present invention (8) is the tire of any combination of the present inventions (1) to (7), wherein the rubber composition constituting the cap rubber layer contains a dispersant.

The present invention (9) is the tire according to the present invention (8), wherein the content of the dispersant is more than 0.5 parts by mass and less than 10 parts by mass with respect to 100 parts by mass of the rubber component.

The present invention (10) is the tire of any combination of the present inventions (1) to (9), wherein the thickness of the cap rubber layer in the entire tread portion is 10% or more.

The present invention (11) is the tire of any combination of the present inventions (1) to (10), wherein the land ratio in the tread portion is 40% or more, and the product of the content (parts by mass) of the styrene-butadiene rubber (SBR) having a styrene content of 25% by mass or less in 100 parts by mass of the rubber component and the land ratio (%) in the tread portion (the content×the land ratio) is 3000 or more.

The present invention (12) is the tire of any combination of the present inventions (1) to (11), wherein the aspect ratio is 80% or less, and the product of the silica content (parts by mass) with respect to 100 parts by mass of the rubber component and the aspect ratio (the content×the aspect ratio) is 3000 or more.

The present invention (13) is the tire of any combination of the present inventions (1) to (12), wherein the ratio of the 30° C. tan δ to the thickness T (mm) of the tread portion (30° C. tan δ/T) is 0.02 or more.

The present invention (14) is the tire of any combination of the present inventions (1) to (13), wherein the ratio (M100/T) of the M100 (MPa) to the thickness T (mm) of the tread portion is 0.15 or more.

What is claimed is:

1. A tire having a tread portion with a thickness of 10 mm or less, wherein a cap rubber layer forming the tread portion is formed from a rubber composition containing 40 parts by mass or more and 80 parts by mass or less of styrene-butadiene rubber (SBR) with a styrene content of 25% by mass or less and 3% by mass or more, in 100 parts by mass of the rubber component, and in addition to the rubber component, containing silica, sulfur and carbon black;

having loss tangent 30° C. tan δ of more than 0.18 measured under the conditions of temperature of 30° C., frequency of 10 Hz, initial strain of 5%, dynamic strain rate of 1%, and deformation mode: tensile;

having a glass transition temperature Tg (° C.) of −15° C. or lower; and having a 100% modulus (M100) of 2.7 MPa or more;

wherein the carbon black content is 15 parts by mass or more, and the sulfur content is 1.2 parts by mass or more and 1.5 parts by mass or less with respect to 100 parts by mass of the rubber component; and the ratio of the silica content to the carbon black content is 3.3 or less and an acetone extractable content (AE) of the cap rubber layer is 6.0% by mass or more, and 1.0% by mass or less, and wherein the tread portion has a land ratio of 40% or more, and a product of content (parts by mass) of the SBR in 100 parts by mass of the rubber component and the land ratio (%) in the tread portion (content×land ratio) is 3000 or more.

2. A tire having a tread portion with a thickness of 10 mm or more and 15 mm or less, wherein a cap rubber layer forming the tread portion is formed from a rubber composition containing 40 parts by mass or more and 80 parts by mass or less of styrene-butadiene rubber (SBR) with a styrene content of 25% by mass or less and 3% by mass or more, in 100 parts by mass of the rubber component, and in addition to the rubber component, containing silica and carbon black;

having loss tangent 30° C. tan δ of 0.4 or more measured under the conditions of temperature of 30° C., frequency of 10 Hz, initial strain of 5%, dynamic strain rate of 1%, and deformation mode: tensile;

having a glass transition temperature Tg (° C.) of −15° C. or lower; and having a 100% modulus (M100) of 2.7 MPa or more;

wherein the carbon black content is 15 parts by mass or more with respect to 100 parts by mass of the rubber component, and the ratio of the silica content to the carbon black content is 3.3 or less and the ratio (M100/T) of the M100 (MPa) to the thickness T (mm) of the tread portion is 0.27 or more, and wherein the tread portion has a land ratio of 40% or more, and a product of content (parts by mass) of the SBR in 100 parts by mass of the rubber component and the land ratio (%) in the tread portion (content×land ratio) is 3000 or more.

3. A tire having a tread portion with a thickness of 10 mm or more and 15 mm or less, wherein a cap rubber layer forming the tread portion is formed from a rubber composition containing 40 parts by mass or more and 80 parts by mass or less of styrene-butadiene rubber (SBR) with a styrene content of 25% by mass or less and 3% by mass or more, in 100 parts by mass of the rubber component, and in addition to the rubber component, containing silica and carbon black;

having loss tangent 30° C. tan δ of more than 0.18 measured under the conditions of temperature of 30° C., frequency of 10 Hz, initial strain of 5%, dynamic strain rate of 1%, and deformation mode: tensile;

having a glass transition temperature Tg (° C.) of −15° C. or lower; and having a 100% modulus (M100) of 2.7 MPa or more;

wherein the carbon black content is 15 parts by mass or more and 45 parts by mass or less with respect to 100 parts by mass of the rubber component, the ratio of the silica content to the carbon black content is 1 or more, the ratio (M100/T) of the M100 (MPa) to the thickness T (mm) of the tread portion is 0.27 or more; and an acetone extractable content (AE) of the cap rubber layer is 6.0% by mass or more, and 15.0% by mass or less, and wherein the tread portion has a land ratio of 40% or more, and a product of content (parts by mass) of the SBR in 100 parts by mass of the rubber component and the land ratio (%) in the tread portion (content×land ratio) is 3000 or more.

4. The tire according to claim 3, wherein the 30° C. tan δ is 0.24 or more.

5. The tire according to claim 3, wherein the content of the carbon black is 30 parts by mass or more with respect to 100 parts by mass of the rubber component.

6. The tire according to claim 3, wherein the thickness of the cap rubber layer in the entire tread portion is 10% or more.

7. The tire according to claim 3, wherein the aspect ratio is 80% or less, and the product of the silica content (parts by mass) with respect to 100 parts by mass of the rubber component and the aspect ratio (the content×the aspect ratio) is 3000 or more.

8. The tire according to claim 3, wherein the ratio of the 30° C. tan δ to the thickness T (mm) of the tread portion (30° C. tan δ/T) is 0.02 or more.

9. The tire according to claim 3, wherein the rubber composition constituting the cap rubber layer has a glass transition temperature Tg (° C.) of −45° C. or higher and −10° C. or lower.

10. The tire according to claim 9, wherein the rubber composition constituting the cap rubber layer has a glass transition temperature Tg (° C.) of −40° C. or higher and −30° C. or lower.

11. The tire according to claim 3, wherein the rubber composition constituting the cap rubber layer contains a dispersant.

12. The tire according to claim 11, wherein the content of the dispersant is more than 0.5 parts by mass and less than 10 parts by mass with respect to 100 parts by mass of the rubber component.

* * * * *